US008169562B2

(12) United States Patent
Jing

(10) Patent No.: US 8,169,562 B2
(45) Date of Patent: May 1, 2012

(54) LIQUID CRYSTAL DISPLAY WITH PLASTIC FRAME HAVING SIDE OPENING AND COOPERATIVE SLIDING GUIDE

(75) Inventor: Xiao-Hong Jing, Shenzhen (CN)

(73) Assignees: Innocom Technology (Shenzhen) Co., Ltd., Shenzhen (CN); Chimei Innolux Corporation, Miaoli County (TW)

( * ) Notice: Subject to any disclaimer, the term of this patent is extended or adjusted under 35 U.S.C. 154(b) by 1144 days.

(21) Appl. No.: 12/008,758

(22) Filed: Jan. 14, 2008

(65) Prior Publication Data

US 2008/0170171 A1 Jul. 17, 2008

(30) Foreign Application Priority Data

Jan. 12, 2007 (CN) .................... 2007 2 0118057 U

(51) Int. Cl.
*G02F 1/1333* (2006.01)
(52) U.S. Cl. ......................................................... 349/58
(58) Field of Classification Search ........................ None
See application file for complete search history.

(56) References Cited

U.S. PATENT DOCUMENTS

| 6,609,808 | B2 * | 8/2003 | Chen .............................. 362/632 |
| 6,879,308 | B2 * | 4/2005 | Hsieh et al. ...................... 345/87 |
| 2002/0113919 | A1 * | 8/2002 | Liu et al. .......................... 349/65 |

* cited by examiner

*Primary Examiner* — Timothy L Rude
(74) *Attorney, Agent, or Firm* — WPAT., P.C.; Justin King

(57) ABSTRACT

An exemplary liquid crystal display includes a liquid crystal panel, and a plastic frame accommodating the liquid crystal panel. The liquid crystal panel includes a display region, and peripheral regions adjacent to the display region. The plastic frame includes an opening defined in portions where a first side wall is located, two second side walls adjacent to the first side wall, two sliding guides defined at opposite inner sides of portions of the plastic frame that are adjacent to the second side walls, and a stopping board. The opening allows the liquid crystal panel to be inserted into the plastic frame therethrough. The sliding guides communicate with the opening, and are allow the liquid crystal panel to slide into the plastic frame therealong. The stopping board abuts the peripheral regions of the liquid crystal panel for limiting the liquid crystal panel from undesirably departing from the plastic frame.

18 Claims, 4 Drawing Sheets

# LIQUID CRYSTAL DISPLAY WITH PLASTIC FRAME HAVING SIDE OPENING AND COOPERATIVE SLIDING GUIDE

CROSS-REFERENCE TO RELATED APPLICATION

This application is related to, and claims the benefit of, a foreign priority application filed in China as Serial No. 200720118057.7 on Jan. 12, 2007. The related application is incorporated herein by reference.

FIELD OF THE INVENTION

The present invention relates to a liquid crystal display (LCD) that includes a plastic frame having a side opening and at least one cooperative sliding guide.

GENERAL BACKGROUND

Recently, liquid crystal displays that are light and thin and have low power consumption characteristics have been widely used in office automation equipment, video units, and the like.

Referring to FIG. 6, a typical liquid crystal display 6 includes a top bezel 60, a liquid crystal panel 61, a plastic frame 62, a light guide plate 63, and a bottom tray 64, arranged in that order from top to bottom. The liquid crystal display 6 further includes a linear light source 65 located adjacent to a lateral thin side (not labeled) of the light guide plate 63. When the liquid crystal display 6 is assembled, the top bezel 60 and the bottom tray 64 cooperatively define a housing for accommodating the liquid crystal panel 61, the plastic frame 62, the light guide plate 63, and the light source 65 therein.

The top bezel 60 is generally manufactured by a mechanical stamping method. This typically requires a large-sized metallic plate (not shown), because of the broad expanse of the structure of the top bezel 60. The need for the large-sized metallic plate adds to the cost of manufacturing the top bezel 60. Furthermore, the top bezel 60 made from the large-sized metallic plate generally has a great weight, therefore adds to the overall weight of the liquid crystal display 6. That is, the liquid crystal display 6 is unable to be used in compact and light applications.

What is needed, therefore, is a liquid crystal display that can circumvent, overcome or at least mitigate the above-described difficulties.

SUMMARY

In an exemplary embodiment, a liquid crystal display includes a liquid crystal panel, and a plastic frame accommodating the liquid crystal panel. The liquid crystal panel includes a display region, and peripheral regions adjacent to the display region. The plastic frame includes an opening defined in portions where a first side wall is located, two second side walls adjacent to the first side wall, two sliding guides defined at opposite inner sides of portions of the plastic frame that are adjacent to the second side walls, and a stopping board. The opening is configured (i.e., structured and arranged) for allowing the liquid crystal panel to be inserted into the plastic frame therethrough. The sliding guides communicate with the opening, and are configured for allowing the liquid crystal panel to slide into the plastic frame therealong. The stopping board abuts the peripheral regions of the liquid crystal panel for limiting the liquid crystal panel from undesirably departing from the plastic frame.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe various embodiments of the present invention in detail.

Figure 1:
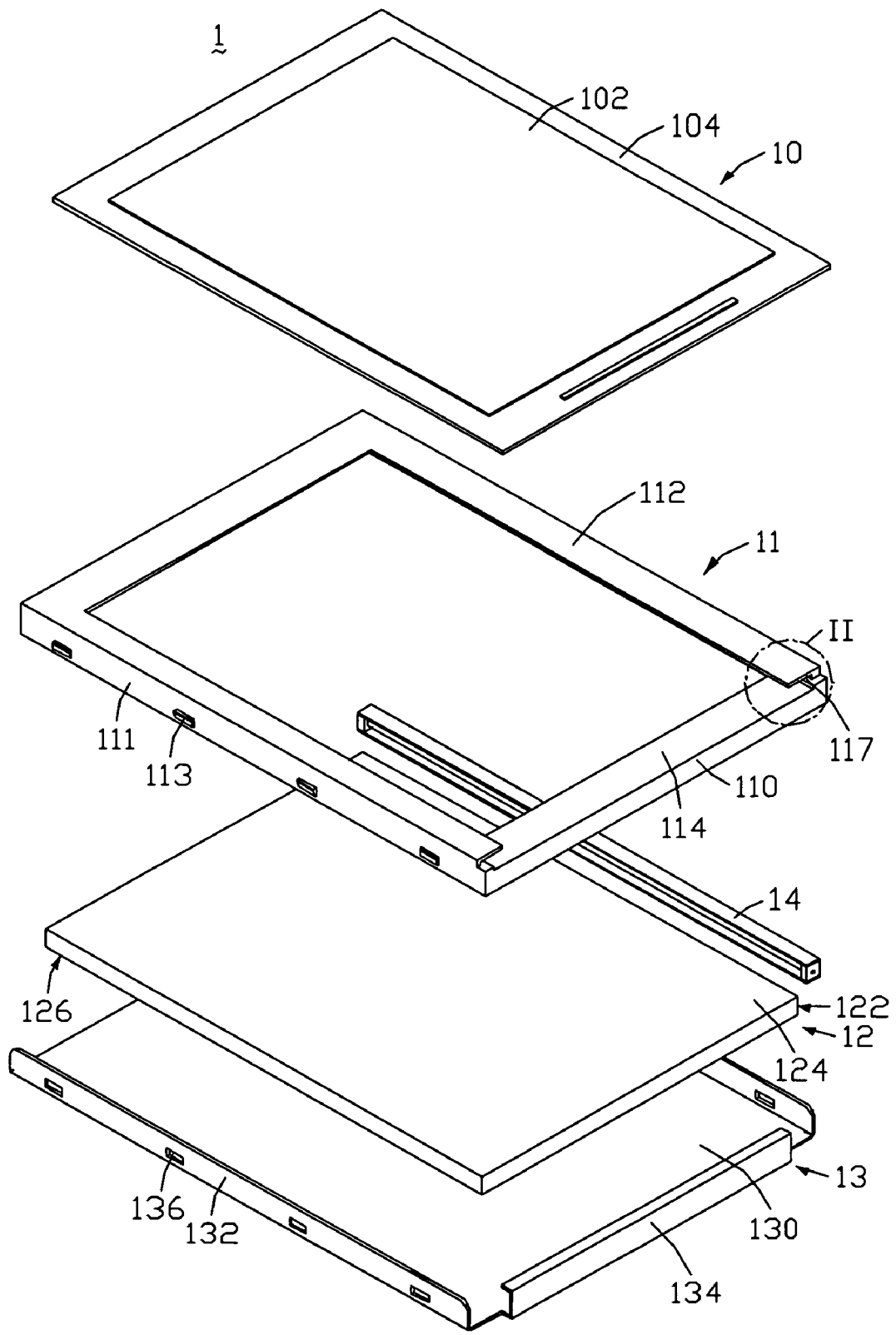
FIG. 1 is an exploded, isometric view of a liquid crystal display according to a first embodiment of the present invention, the liquid crystal display including a plastic frame.

Referring to FIG. 1, a liquid crystal display 1 according to a first embodiment of the present invention is shown. The liquid crystal display 1 includes a liquid crystal panel 10, a plastic frame 11, a light guide plate 12, and a bottom tray 13, arranged in that order from top to bottom. The liquid crystal display 1 further includes a light source 14 located adjacent to the light guide plate 12.

The liquid crystal panel 10 is substantially rectangular, and includes a display region 102, and peripheral regions 104 adjacent to the display region 102. A polarizer (invisible) is adhered to a bottom side of the display region 102 of the liquid crystal panel 10.

The plastic frame 11 has a substantially rectangular shape. The plastic frame 11 includes two opposite first side walls 110, two opposite second side walls 111, and a top wall 112. The first side walls 110 and the second side walls 111 are connected end to end, and the first side walls 110 are essentially perpendicular to the second side walls 111. Thus, the plastic frame 11 can be considered to define an upper space (not labeled), and a lower space (not labeled) directly communicating with the upper space therein.

Figure 2:
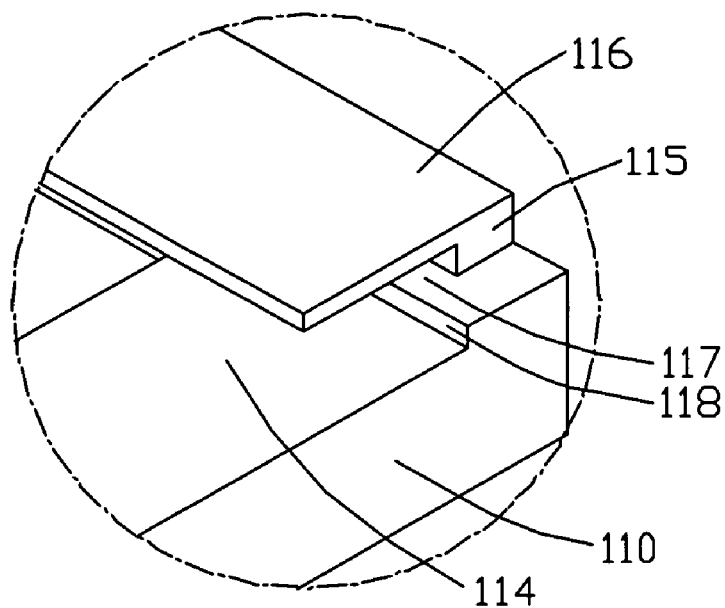
FIG. 2 is an enlarged view of a circled portion II of FIG. 1.

Referring also to FIG. 2, each of the second side walls 111 defines a step 118 adjacent to the upper space, and include a plurality of ears 113 outwardly extending from an outer surface (not labeled) thereof. A height of the step 118 is greater than a thickness of the polarizer adhered to the bottom side of the liquid crystal panel 10.

The top wall 112 includes a side base 115, and a top board 116 extending from the side base 115 as a whole piece. The side base 115 upwardly extends from top peripheral regions of the second side walls 111 and one of the first side walls 110. Outmost extremities of the side base 115 are substantially coplanar with those of the corresponding second side walls 111 and the first side wall 110. The top board 116 inwardly extends toward the upper space, and defines a window (not labeled) for allowing viewing the display region 102 of the liquid crystal panel 10. A distance between bottommost extremities of the top board 116 and respective uncovered top peripheral portions of the second side walls 111 is substantially the same as a height of the peripheral regions 104 of the liquid crystal panel 10. That is, the plastic frame 11 can be considered to include an opening 114 and two sliding guides 117 defined therein, respectively. The opening 114 is defined in portions wherein the other first side wall 110 is located, and directly communicates with the upper space, which opening 114 allows the liquid crystal panel 10 to be inserted into the plastic frame 11 therethrough. The sliding guides 117 are defined by the top board 116, the uncovered top peripheral portions of the second side walls 111, and the side base 115, cooperatively. A height of each sliding guide 117 is substantially the same as a height of the peripheral regions 104 of the liquid crystal panel 10, thus allowing the liquid crystal panel 10 to slide into the plastic frame 11 along the sliding guides 117. In alternative embodiment, the plastic frame 11 can be made from polycarbonate, or other suitable materials.

The light guide plate 12 includes a lateral light incident surface 122 adjacent to the light source 14, a top light emitting surface 124 perpendicular to the light incident surface 122, and a bottom surface 126. The light guide plate 12 and the light source 14 cooperatively serve to provide uniform light beams for the liquid crystal panel 10. The light guide plate 12 can for example be made from polycarbonate or polymethyl methacrylate (PMMA), and can be manufactured using an injection molding method.

The bottom tray 13 includes a rectangular bottom plate 130, two first side plates 132, and a second side plate 134. The first side plates 132 upwardly extend from two opposite long sides of the bottom plate 130, and each include a plurality of notches 136 defined therein. The notches 136 of the first side plates 132 respectively correspond to the ears 113 of the second side walls 111. The second side plate 134 upwardly extends from a short side of the bottom plate 130, and corresponds to the other first side wall 110 where the opening 114 is defined. The second side plate 134 has a substantially U-shaped profile, and includes a top portion extending parallel to the bottom plate 130, inwardly. The bottom tray 13 can for example be made from steel, iron, aluminum, magnesium, or any suitable alloy that includes at least one of these metals.

Figure 3:
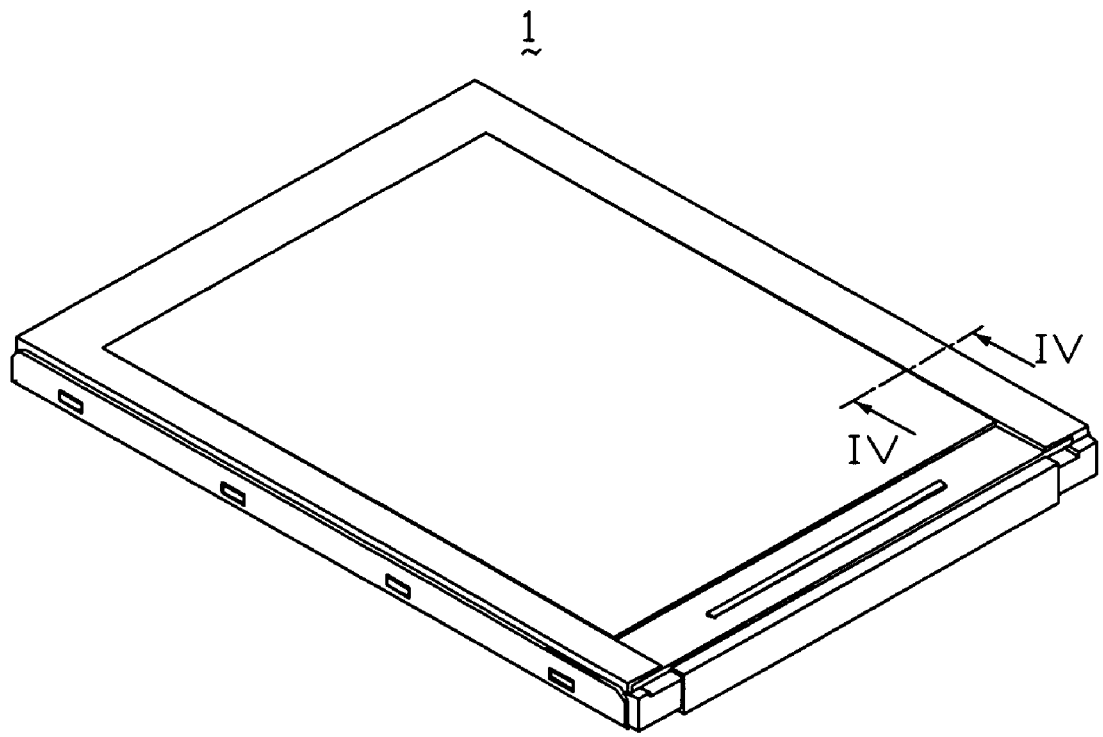
FIG. 3 is an assembled view of the liquid crystal display of FIG. 1.
Figure 4:
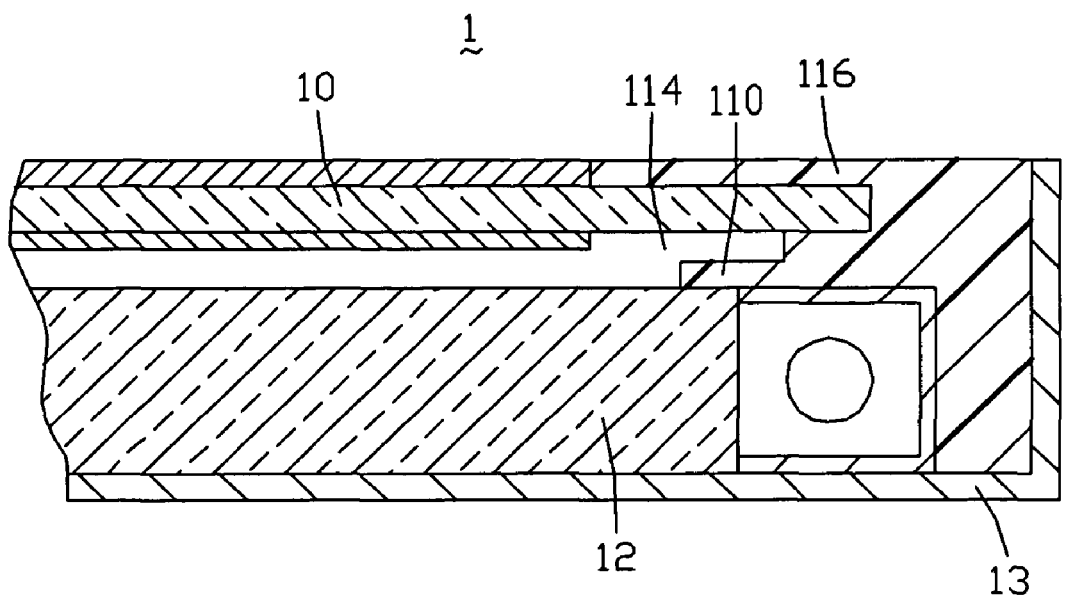
FIG. 4 is a side, cross-sectional view taken along line IV-IV of FIG. 3.

The liquid crystal display 1 can be assembled according to the following steps. First, the liquid crystal panel 10 is aligned with the opening 114 and the sliding guides 117 of the plastic frame 11. Second, the liquid crystal panel 10 is pushed into the plastic frame 11 through the opening 114. The peripheral regions 104 of the liquid crystal panel 10 slide in the sliding guides 117. When one side of the liquid crystal panel 110 contacts the first side wall 110 opposite to the opening 114, the liquid crystal panel 10 is completely received in the plastic frame 11. The peripheral regions 104 of the liquid crystal panel 10 are supported by the second side walls 111, and top surfaces (not labeled) of the peripheral regions 104 of the liquid crystal panel 10 respectively abut the bottom extremities of the top board 116. That is, the top board 116 limits vertical movements of the liquid crystal panel 10. Third, the plastic frame 11 including the liquid crystal panel 10 received therein is reversed, and the light guide plate 12 and the light source 14 are received in the lower space of the plastic frame 11. Fourth, the bottom tray 13 is fixed to the plastic frame 11. The bottom tray 13 is aligned with the plastic frame 11, with the notches 136 respectively corresponding to the ears 113 of the plastic frame 11. The bottom tray 13 is pressed toward the plastic frame 11, the ears 113 are reliably fixed in the notches 136, respectively. The top portion of the second side plate 134 slightly presses the other side of the liquid crystal panel 10 to limit the liquid crystal panel 10 from sliding off from the opening 114. Therefore, the liquid crystal display 1 is reliably assembled, as is shown in FIG. 3. Detachment of liquid crystal display 1 is essentially the reverse of the above-described assembly procedure.

In summary, the liquid crystal panel 10 is received in the plastic frame 11 by sliding motion, and is limited from falling out from the plastic frame 11 by the top board 116 and the second side plate 134. Thus, the liquid crystal panel 10 can be conveniently and reliably assembled. Further, the height of the step 118 is greater than the thickness of the polarizer adhered to the bottom side of the liquid crystal panel 10, which helps to prevent the polarizer from being scraped by the first side wall 110 when the liquid crystal panel 10 slides in the plastic frame 11. Therefore, a conventional top bezel can be reduced, and the weight of the liquid crystal display 1 is reduced. That is, the liquid crystal display 1 has a low cost, and is able to be used in compact and light applications.

Figure 5:
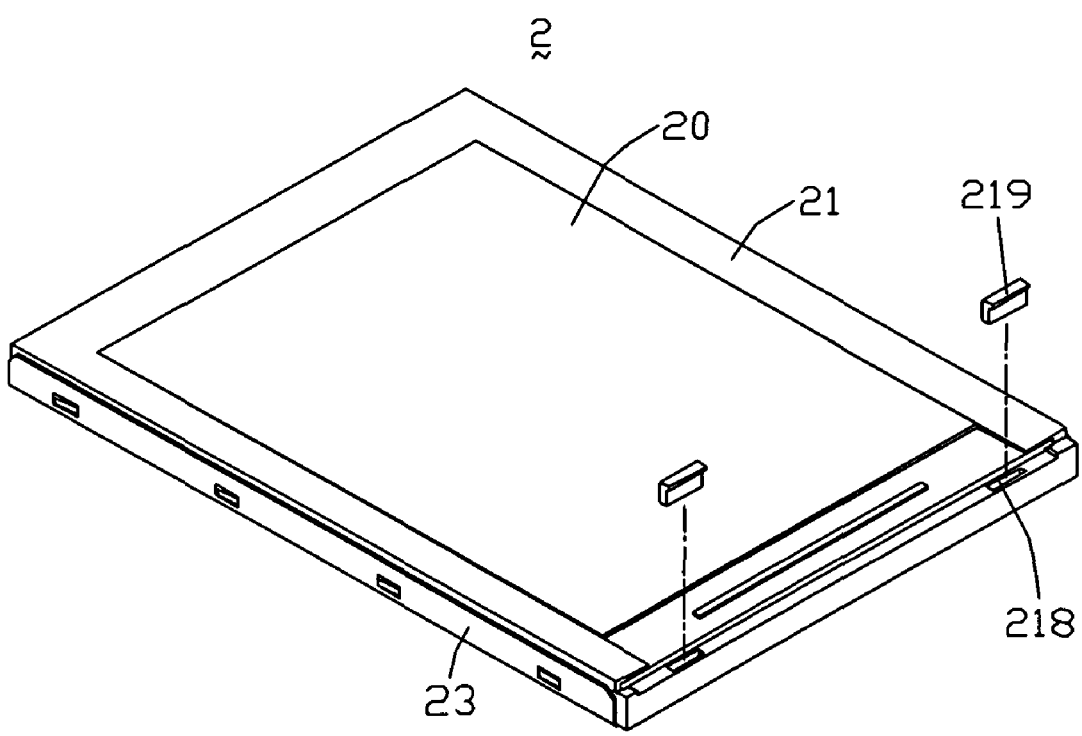
FIG. 5 is a partly assembled view of a liquid crystal display according to a second embodiment of the present invention.
Figure 6:
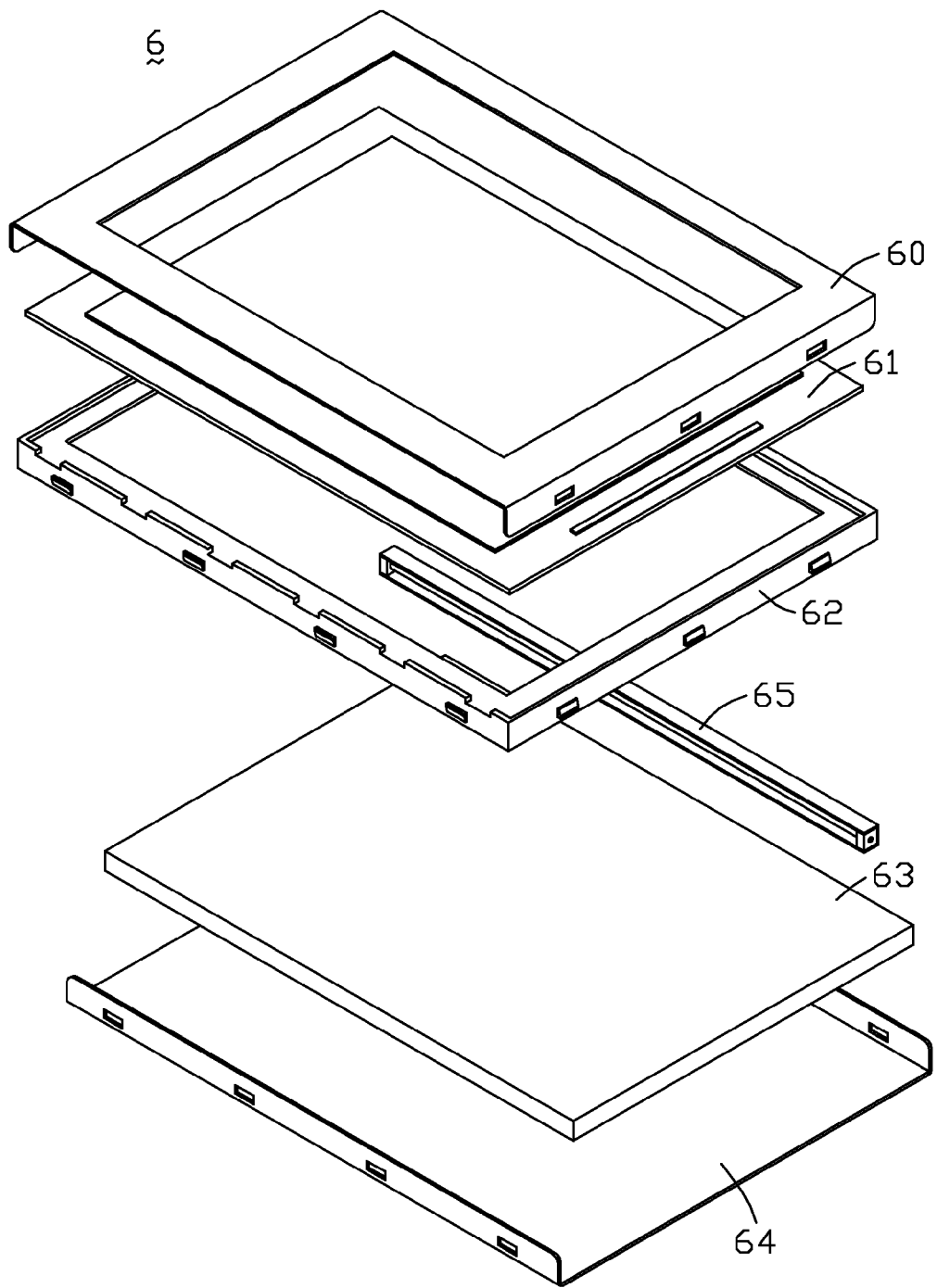
FIG. 6 is an exploded, isometric view of a conventional liquid crystal display.

Referring to FIG. 5, a liquid crystal display 2 according to a second embodiment of the present invention is similar to the liquid crystal display 1. However, the liquid crystal display 2 includes a liquid crystal panel 20, a plastic frame 21, and a bottom tray 23. The plastic frame 21 includes an opening (not labeled) and two opposite sliding guides (not labeled) defined therein, which opening and sliding guides are essentially similar to those of the liquid crystal display 1 of the first embodiment. The plastic frame 21 further includes a pair of blind cavities 218 defined in a side wall (not labeled) where the opening is defined, and the blind cavities 218 communicate with the opening. The liquid crystal display 2 further includes a pair of stopping pins 219 corresponding to the blind cavities 218. The stopping pins 219 are partly fixed in the blind cavities 218, and the other portions exposed out the blind cavities 218 can stop the liquid crystal panel 20 from sliding off from the plastic frame 21 through the opening. Unlike the bottom tray 13 of the first embodiment, the bottom tray 23 does not need a side plate similar to the second side plate 134 of the bottom tray 13. Therefore, a weight of the liquid crystal display 2 can be further reduced. In other aspects, the liquid crystal display 2 has advantages similar to those described above in relation to the liquid crystal display 1.

Further or alternative embodiments may include the following. In one example, the opening 114 is defined in the lateral long side of the plastic frame 11. In such a case, the sliding guides 117 are defined along the opposite short sides of the plastic frame 11. In another example, the liquid crystal display 1 includes one or more stopping pins configured for stopping the liquid crystal panel 10 from sliding off from the plastic frame 11 without the need of the second side plate 134 of the bottom tray 13. In a further example, the liquid crystal display 1 includes only a single sliding guide 117 in a lateral side thereof. In such a case, the liquid crystal display 1 includes a planar portion at another opposite side thereof, which planar portion cooperates with the single sliding guide 117 to allow the liquid crystal panel 10 to slide in the plastic frame 11.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
a liquid crystal panel comprising:
a display region; and
peripheral regions adjacent to the display region; and
a plastic frame accommodating the liquid crystal panel, the plastic frame comprising:
an opening defined in portions where a first side wall is located, the opening configured for allowing the liquid crystal panel to be inserted into the plastic frame therethrough;
two second side walls adjacent to the first side wall;
two sliding guides defined at opposite inner sides of portions of the plastic frame that are adjacent to the second side walls, the sliding guides communicating with the opening, and configured for allowing the liquid crystal panel to slide into the plastic frame therealong;
a stopping board abutting the peripheral regions of the liquid crystal panel for limiting the liquid crystal panel from undesirably departing from the plastic frame; and
at least one stopping pin provided on the way where the liquid crystal panel slides off from the plastic frame.

2. The liquid crystal display as claimed in claim 1, wherein the liquid crystal panel further comprises a polarizer adhered to a bottom side of the display region.

3. The liquid crystal display as claimed in claim 2, wherein each of the second side walls defines a step adjacent to the respective sliding guide, and the liquid crystal panel is supported by portions of the plastic frame that define the steps.

4. The liquid crystal display as claimed in claim 3, wherein a height of each step is greater than a thickness of the polarizer.

5. The liquid crystal display as claimed in claim 1, wherein a height of each sliding guide is substantially the same as that of the peripheral regions of the liquid crystal panel.

6. The liquid crystal display as claimed in claim 1, wherein the stopping board defines a window for allowing viewing of the display region of the liquid crystal panel.

7. The liquid crystal display as claimed in claim 1, wherein the plastic frame further comprises a side base interconnecting the stopping board and the second side walls.

8. The liquid crystal display as claimed in claim 7, wherein the side base partly covers the second side walls, and the sliding guides are defined by the side base, the top plate, and the second side walls, cooperatively.

9. The liquid crystal display as claimed in claim 1, further comprising a bottom tray detachably secured to the plastic frame.

10. The liquid crystal display as claimed in claim 1, wherein the plastic frame further comprises at least one cavity defined in the first side wall, the at least one cavity partly receives the at least one stopping pin, and exposed portions of the at least one stopping pin is configured for limiting the liquid crystal panel from sliding off from the plastic frame.

11. The liquid crystal display as claimed in claim 1, wherein the opening is defined in a lateral thin side of the plastic frame.

12. A liquid crystal display comprising:
a liquid crystal panel comprising:
a display region; and
peripheral regions adjacent to the display region; and
a plastic frame accommodating the liquid crystal panel, the plastic frame comprising:
an entrance defined in a lateral side thereof, the entrance configured for allowing the liquid crystal panel to be inserted into the plastic frame therethrough;
at least one sliding guide defined therein, the at least one sliding guide communicating with the entrance, and configured for guiding the liquid crystal panel to slide into the plastic frame;
a top plate abutting the peripheral regions of the liquid crystal panel for limiting the liquid crystal panel from undesirably departing from the plastic, frame; and
at least one stopping pin provided at the entrance and positioned for preventing the liquid crystal panel from sliding off from the plastic frame via the entrance.

13. The liquid crystal display as claimed in claim 12, wherein the plastic frame comprises a first side wall located where the opening is defined, and a second side wall located where the at least one sliding guide is defined.

14. The liquid crystal display as claimed in claim 13, wherein the liquid crystal panel further comprises a polarizer adhered to a bottom side of the display region, and the second side wall defines a step adjacent to the at least one sliding guide.

15. The liquid crystal display as claimed in claim 14, wherein the liquid crystal panel is supported by portions of the second side wall that define the step, and a height of the step is greater than that of the polarizer.

16. The liquid crystal display as claimed in claim 12, wherein a height of the at least one sliding guide is substantially the same as that of the peripheral regions of the liquid crystal panel.

17. The liquid crystal display as claimed in claim 12, wherein the plastic frame further comprises at least one cavity defined therein, the at least one cavity partly receives the at least one stopping pin, and exposed portions of the at least one stopping pin are configured for limiting the liquid crystal panel from sliding off from the plastic frame.

18. A liquid crystal display comprising:
a liquid crystal panel comprising:
a display region; and
peripheral regions adjacent to the display region;
a plastic frame accommodating the liquid crystal panel, the plastic frame comprising:
an opening defined in a lateral side thereof, the opening configured for allowing the liquid crystal panel to be inserted into the plastic frame therethrough;
at least one sliding guide defined therein, the at least one sliding guide communicating with the opening, and configured for allowing the liquid crystal panel to slide into the plastic frame therealong; and
a top plate abutting the peripheral regions of the liquid crystal panel for limiting the liquid crystal panel from undesirably departing from the plastic frame; and
a bottom tray detachably secured to the plastic frame, wherein the bottom tray comprises a side portion configured for limiting the liquid crystal panel from sliding off from the plastic frame via the opening.

* * * * *